United States Patent
Hamada et al.

(10) Patent No.: US 11,780,309 B2
(45) Date of Patent: Oct. 10, 2023

(54) DOOR WEATHER STRIP

(71) Applicant: TOYODA GOSEI CO., LTD., Kiyosu (JP)

(72) Inventors: Shinnosuke Hamada, Kiyosu (JP); Yoshinobu Yamada, Kiyosu (JP); Kentaro Adachi, Kiyosu (JP); Yasuyuki Kinoshita, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/665,961

(22) Filed: Feb. 7, 2022

(65) Prior Publication Data

US 2022/0297519 A1 Sep. 22, 2022

(30) Foreign Application Priority Data

Mar. 19, 2021 (JP) ................................. 2021-045806

(51) Int. Cl.
*B60J 10/16* (2016.01)
*B60J 10/86* (2016.01)

(52) U.S. Cl.
CPC .............. *B60J 10/86* (2016.02); *B60J 10/16* (2016.02)

(58) Field of Classification Search
CPC ... B60J 10/86; B60J 10/16; B60J 10/88; B60J 10/24
See application file for complete search history.

(56) References Cited

U.S. PATENT DOCUMENTS

| | | | | |
|---|---|---|---|---|
| 8,458,959 B2* | 6/2013 | Ohtake | ................... | B60J 10/86 49/502 |
| 10,744,861 B2* | 8/2020 | Kawai | ................... | B60J 10/21 |
| 2005/0022454 A1* | 2/2005 | Aida | ................... | B60J 10/27 49/499.1 |
| 2013/0232881 A1* | 9/2013 | Adachi | ................... | B60J 10/16 49/490.1 |
| 2013/0305612 A1* | 11/2013 | Murree | ................... | B60J 10/16 49/489.1 |
| 2014/0000174 A1* | 1/2014 | Minagawa | ................ | B60J 10/86 49/483.1 |
| 2014/0212621 A1* | 7/2014 | Blottiau | ................... | B60R 13/06 264/254 |
| 2020/0369137 A1* | 11/2020 | Tawada | ................... | B60J 10/277 |

FOREIGN PATENT DOCUMENTS

| | | |
|---|---|---|
| JP | 2010-036602 A | 2/2010 |
| JP | 2011-025855 A | 2/2011 |

* cited by examiner

*Primary Examiner* — Janet M Wilkens
*Assistant Examiner* — Susan M. Heschel
(74) *Attorney, Agent, or Firm* — POSZ LAW GROUP, PLC

(57) ABSTRACT

A door weather strip includes at least an exterior installation base member installed on a door frame or a door molding, and a seal lip that is formed protruding and extending above and outside in a vehicle width direction from the exterior installation base member and elastically comes into contact with a vehicle body opening peripheral edge when a door is closed, in which a hard portion that is harder than a seal lip main body portion constituting the seal lip is formed between a tip of the seal lip and a root portion between the seal lip and the exterior installation base member and on the vehicle body opening peripheral edge side.

6 Claims, 8 Drawing Sheets

VEHICLE INTERIOR SIDE ⟷ VEHICLE EXTERIOR SIDE

VEHICLE INTERIOR SIDE ←→ VEHICLE EXTERIOR SIDE

VEHICLE INTERIOR SIDE ←→ VEHICLE EXTERIOR SIDE

VEHICLE INTERIOR SIDE ←→ VEHICLE EXTERIOR SIDE

VEHICLE INTERIOR ⟷ VEHICLE EXTERIOR
SIDE                SIDE

VEHICLE INTERIOR SIDE ⟵⟶ VEHICLE EXTERIOR SIDE

DOOR WEATHER STRIP

CROSS REFERENCE TO RELATED APPLICATION

This application claims the priority benefit of Japanese Patent Application No. 2021-045806 filed on Mar. 19, 2021. The entirely of the above-mentioned patent application is hereby incorporated by reference herein and made a part of this application.

BACKGROUND OF THE INVENTION

(1) Field of the Invention

The present invention relates to a door weather strip for an automobile that suppresses that a door frame of an automobile door is drawn to the outside of the automobile due to a pressure difference between the inside and the outside of the automobile during high-speed traveling of the automobile.

(2) Description of Related Art

For example, as shown in FIG. 7, a door weather strip 100 is attached to a door frame 201 and a door molding 600. The door frame 201 to which the door weather strip 100 is attached is a so-called hidden type. In the hidden type door frame 201, a tip width on the outside (vehicle exterior side) in a vehicle width direction is narrow, and the tip is covered by the door molding 600, and is configured so that it cannot be seen from the vehicle exterior side.

The door weather strip 100 is constituted of an exterior weather strip 200, an interior weather strip 300, and a weather strip connecting portion 400, and the exterior weather strip 200 is constituted of an exterior installation base member 210 and an exterior seal portion 220. The exterior seal portion 220 closes a gap between a vehicle body opening peripheral edge 601 and a tip of the door molding 600 when a door is closed. Since the exterior seal portion 220 is formed in a lip shape, the exterior seal portion 220 is easily bent, and a door closing force can be reduced (for example, Japanese Patent Application Laid-Open No. 2010-36602).

By the way, when an automobile travels at high speed, vehicle exterior pressure of the door is significantly lower than vehicle interior pressure. Therefore, due to the pressure difference, in the door frame 201 and the door molding 600, a force F1 in a direction of being drawn to the vehicle exterior side as shown in FIG. 7 occurs. At that time, a reaction force F2 is generated in a vehicle interior direction between the vehicle body opening peripheral edge 601 and the exterior seal portion 220 in elastically contact with the vehicle body opening peripheral edge 601.

However, since the exterior seal portion 220 has a lip shape and is easily bent, when F1 becomes large, the exterior seal portion 220 is greatly bent and deformed as shown in FIG. 8, and as a result, the door frame 201 and the door molding 600 move to the vehicle exterior side. A phenomenon in which the door frame 201 and the door molding 600 move to the vehicle exterior side, that is, a phenomenon of being drawn to the vehicle exterior side causes a decrease in sound insulation and a bending deformation of the door frame 201.

As a countermeasure against such drawing of the door frame 201, for example, Japanese Patent Application Laid-Open No. 2011-25855 describes the following technique. As shown in FIG. 9, inside (vehicle interior side) the door weather strip 100 in the vehicle width direction, a large engagement block 500 having a top portion 510 protruding from a door sash 101 toward the vehicle body opening peripheral edge 601 and a bridge portion 410 are integrally formed, and, on the other hand, at the vehicle body opening peripheral edge 601, a bulging portion 670 in which a body side outer panel 650 protrudes toward the door sash 101 is formed.

Since the engagement block 500 is set to interfere with the bulging portion 670 with respect to a direction F in which the door sash 101 is drawn during high-speed traveling, the engagement block 500 is abutted against the bulging portion 670 when the door sash 101 is drawn to the vehicle exterior side and moves during high-speed traveling, whereby the door sash 101 is prevented from being further drawn to the vehicle exterior side. On the other hand, since the engagement block 500 has an inclined portion between the top portion 510 and the bridge portion 410, the engagement block 500 does not interfere with the bulging portion 670 in a door opening direction O.

SUMMARY OF THE INVENTION

However, the technique of Japanese Patent Application Laid-Open No. 2011-25855 has a problem that the door weather strip 100 becomes heavy because the large engagement block 500 and the bridge portion 410 are newly formed. In addition, the body side outer panel 650 also needs to be newly processed to form the bulging portion 670 protruding toward the door sash 101 so as to be able to be abutted against the engagement block 500. Therefore, there are problems in terms of cost and weight reduction.

It is an object of the present invention to provide a door weather strip for an automobile that can suppress that a door frame of an automobile door is drawn to the outside of the automobile due to a pressure difference between the inside and the outside of the automobile during high-speed traveling of the automobile and can reduce the cost and weight.

In order to solve the above problems, according to a first disclosed aspect, a door weather strip is provided that seals between an automobile door and a vehicle body opening peripheral edge and is attached to an outer periphery of a door frame of the door, the door weather strip includes at least an installation base member installed on the door frame or a door molding, and a seal lip that is formed protruding and extending above and outside in a vehicle width direction from the installation base member and elastically comes into contact with the vehicle body opening peripheral edge when the door is closed, in which a hard portion that is harder than a seal lip main body portion constituting the seal lip is formed between a tip of the seal lip and a root portion between the seal lip and the installation base member and on the vehicle body opening peripheral edge side.

According to the first disclosed aspect, the door weather strip includes at least the installation base member installed on the door frame or the door molding, and the seal lip that is formed protruding and extending above and outside in the vehicle width direction from the installation base member and elastically comes into contact with the vehicle body opening peripheral edge when the door is closed, and the hard portion that is harder than the seal lip main body portion constituting the seal lip is formed between the tip of the seal lip and the root portion between the seal lip and the installation base member and on the vehicle body opening peripheral edge side. Therefore, when a force in an outward (vehicle exterior side) direction in the vehicle width direction is generated is generated at the door frame by a pressure difference between the inside and the outside of the automobile during high-speed traveling of the automobile, the hard portion suppresses bending of the seal lip itself, and, in addition, while a force (X) in a direction of shrinking inward (vehicle interior side) in the vehicle width direction is generated at the tip that is elastically in contact with the vehicle body opening peripheral edge, a force (Y) that pushes back the force (X) is generated on a tip side of the hard portion.

In addition, since the seal lip bends and is elastically in contact with the vehicle body opening peripheral edge, a force (Z) that pushes the vehicle body opening peripheral edge upward in a vertical direction is originally generated at an elastic contact portion, and at an abutment portion of the seal lip in which the bending is suppressed with the vehicle body opening peripheral edge, a force that presses a tip portion of the seal lip toward the vehicle body opening peripheral edge is increased by the force (X) inward (vehicle interior side) in the vehicle width direction, the force (Y) that pushes back, and the force (Z) that pushes the vehicle body opening peripheral edge upward. Therefore, withstanding load with respect to a force in a direction of being drawn to the vehicle exterior side, that is, a reaction force can be increased. As a result, it is possible to suppress that the door frame is drawn to the vehicle exterior side during high-speed traveling of the automobile, and to improve sound insulation during high-speed traveling as compared with the conventional case. Moreover, a bending deformation of the door frame can be suppressed.

A second disclosed aspect includes a door weather strip in which the hard portion is not abutted against the vehicle body opening peripheral edge when the door is closed.

According to the second disclosed aspect, since the hard portion is not abutted against the vehicle body opening peripheral edge when the door is closed, the hard portion does not affect the elastic contact of the tip of the seal lip with the vehicle body opening peripheral edge when the door is closed, and sealing performance between the door and the vehicle body opening peripheral edge can be ensured as in the conventional manner.

A third disclosed aspect includes a door weather strip in which a protrusion that abuts against the vehicle body opening peripheral edge when the door is closed is formed between the tip of the seal lip and the hard portion.

According to the third disclosed aspect, since the protrusion that elastically comes into contact with the vehicle body opening peripheral edge when the door is closed is formed between the tip of the seal lip and the hard portion, when the force outward (vehicle exterior side) in the vehicle width direction is generated at the door frame by the pressure difference between the inside and the outside of the automobile during high-speed traveling of the automobile, a force in an inward (vehicle interior side) direction in the vehicle width direction is generated at the protrusion, and the force deforms the protrusion so as to rotate the protrusion toward a root portion of the seal lip.

As a result, the abutment portion of the seal lip with the vehicle body opening peripheral edge expands to a region from the protrusion to the tip, so that an abutment area increases, and the withstanding load, that is, the reaction force can be increased. Therefore, it is possible to further suppress that the door frame is drawn to the vehicle exterior side during high-speed traveling of the automobile, and to further improve the sound insulation during high-speed traveling as compared with the conventional case. Moreover, a bending deformation of the door frame can be suppressed.

A fourth disclosed aspect includes a door weather strip in which the seal lip main body portion exists between the protrusion and the hard portion.

According to the fourth disclosed aspect, since the seal lip main body portion exists between the protrusion and the hard portion, when the force in the inward (vehicle interior side) direction in the vehicle width direction is generated at the protrusion, a force that pushes back in a tip side direction is generated at the seal lip main body portion that exists. As a result, a force that presses the seal lip against the vehicle body opening peripheral edge increases, and the withstand load against a force that draws to the vehicle exterior side, that is, the reaction force can be further increased, so that it is possible to further suppress that the door frame is drawn to the vehicle exterior side, and to further improve the sound insulation during high-speed traveling. Moreover, a bending deformation of the door frame can be suppressed.

The door weather strip includes at least the installation base member installed on the door frame or the door molding, and the seal lip formed protruding and extending above and outside in the vehicle width direction from the installation base member and elastically comes into contact with the vehicle body opening peripheral edge when the door is closed, and the hard portion that is harder than the seal lip main body portion constituting the seal lip is formed between the tip of the seal lip and the root portion between the seal lip and the installation base member and on the vehicle body opening peripheral edge side. Therefore, when the force in the outward (vehicle exterior side) direction in the vehicle width direction is generated is generated at the door frame by the pressure difference between the inside and the outside of the automobile during high-speed traveling of the automobile, the hard portion suppresses bending of the seal lip itself, and, in addition, while the force (X) in the direction of shrinking inward (vehicle interior side) in the vehicle width direction is generated at the tip that is elastically in contact with the vehicle body opening peripheral edge, the force (Y) that pushes back the force (X) is generated on the tip side of the hard portion.

In addition, since the seal lip bends and is elastically in contact with the vehicle body opening peripheral edge, the force (Z) that pushes the vehicle body opening peripheral edge upward in the vertical direction is originally generated at the elastic contact portion, and at the abutment portion of the seal lip in which the bending is suppressed with the vehicle body opening peripheral edge, the force that presses the tip portion of the seal lip toward the vehicle body opening peripheral edge is increased by the force (X) inward (vehicle interior side) in the vehicle width direction, the force (Y) that pushes back, and the force (Z) that pushes the vehicle body opening peripheral edge upward. Therefore, the withstanding load with respect to the force in the direction of being drawn to the vehicle exterior side, that is, the reaction force can be increased. As a result, it is possible to suppress that the door frame is drawn to the vehicle exterior side during high-speed traveling of the automobile, and to improve sound insulation during high-speed traveling as compared with the conventional case. Moreover, a bending deformation of the door frame can be suppressed.

DETAILED DESCRIPTION OF PREFERRED EMBODIMENTS

Figure 1:
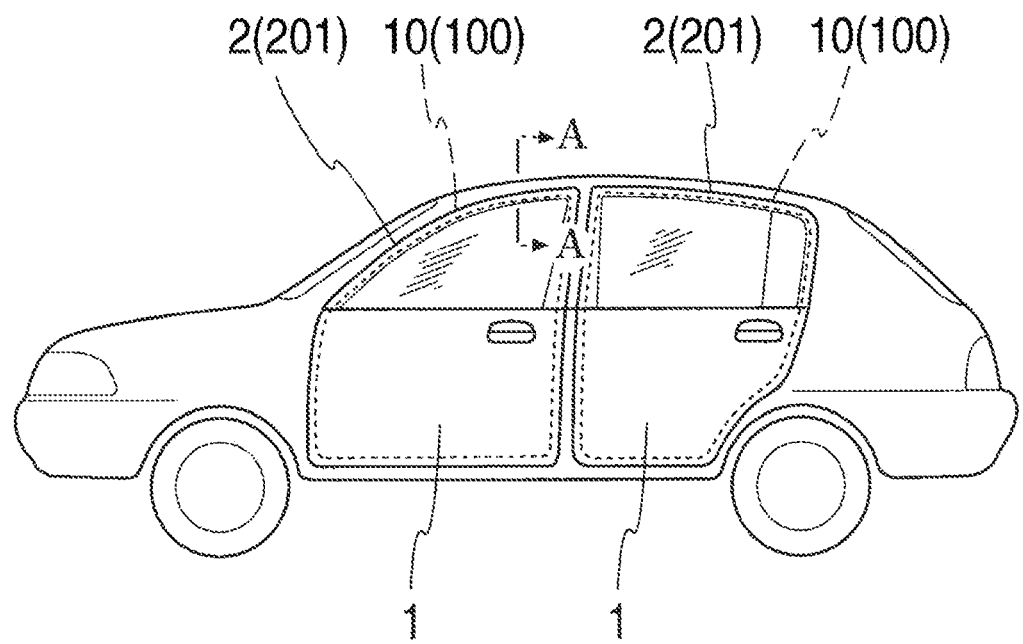
FIG. 1 is a side view of an automobile door used in an embodiment of the present invention.

A first embodiment of the present invention will be described with reference to FIGS. 1 to 4. FIG. 1 is a side view of an automobile. As shown in FIG. 1, a door frame 2 is provided at an outer peripheral portion of an upper portion of a door 1 of the automobile on both a front side and a rear side, and a door weather strip 10 is attached to an outer peripheral portion of the door frame 2, and seals between the door 1 and a vehicle body opening peripheral edge 6 (FIG. 3).

Figure 2:
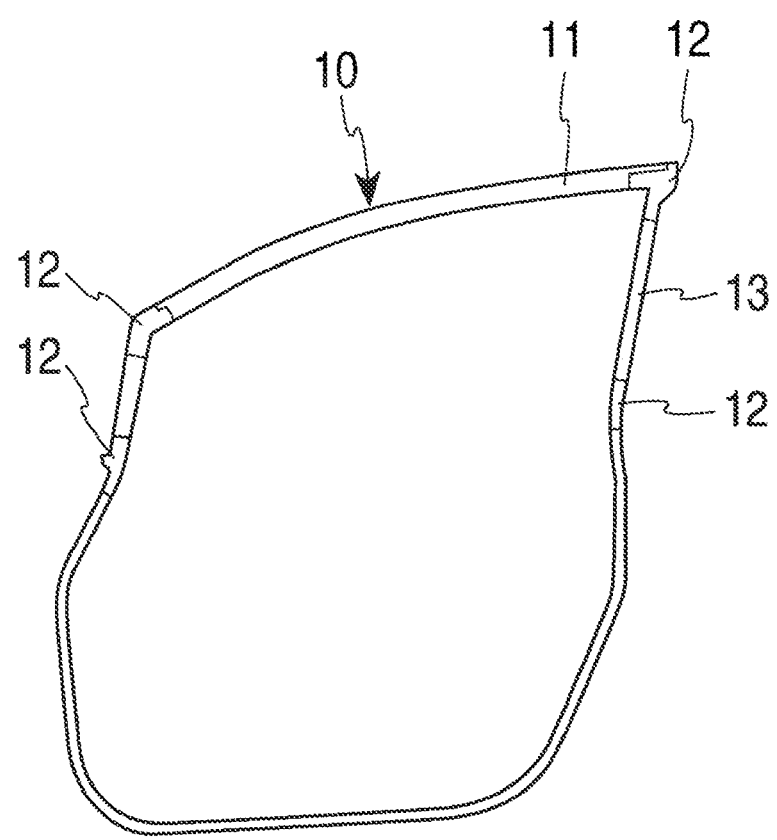
FIG. 2 is an overall plan view of a door weather strip used in the embodiment of the present invention.
Figure 3:
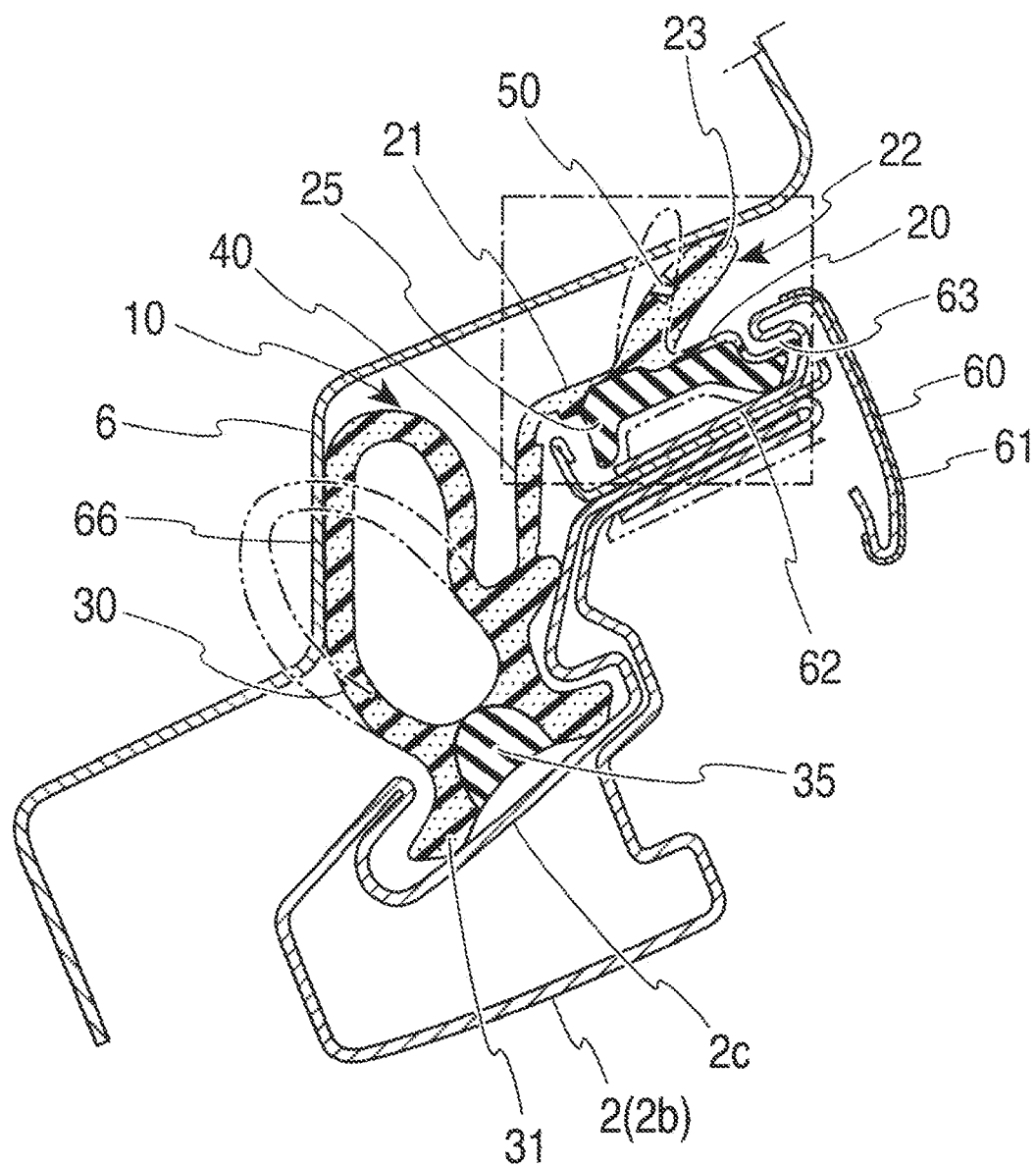
FIG. 3 is a cross-sectional view taken along a line A-A in FIG. 1 of the door weather strip used in a first embodiment of the present invention.

In the door weather strip 10, as shown in FIG. 2, an upper side portion 11 and a vertical side portion 13 corresponding to an upper side and a vertical side of the door frame 2 are molded in an elongated shape by extrusion molding, and a portion of a corner portion 12 corresponding to a corner portion of the door frame 2 connects the upper side portion 11 and the vertical side portion 13 and is formed by mold shaping. The present invention relates to the upper side portion 11 of the door weather strip 10. Although the first embodiment describes a front door on the left side, it can also be applied to a front door on the right side and rear doors on both sides.

The door frame 2 to which the door weather strip 10 is attached is a so-called hidden type in the present invention. As shown in FIG. 3, in the hidden type door frame 2, a width of a tip on a vehicle exterior side is narrow, and the door frame 2 is covered by a door molding 60 attached to the outer periphery of the door frame 2 and is configured so as not to be seen from the vehicle exterior side.

In the first embodiment, the door molding 60 is continuously formed from a molding portion 61 and a retainer portion 62. The molding portion 61 and the retainer portion 62 may be formed separately. In the door molding 60, the retainer portion 62 is fixed to the door frame 2 with rivets, clips, screws, or the like.

The molding portion 61 has a predetermined width so as to cover the tip of the door frame 2, and the lower end thereof is bent in a hairpin shape. A glass run (not shown) is sandwiched and held between the portion bent in the hairpin shape and an inner surface of the door frame 2. On the other hand, an upper end of the molding portion 61 is also bent in a hairpin shape and is continuous with the retainer portion 62. The molding portion 61 and the retainer portion 62 are formed by bending one sheet metal such as stainless steel.

The retainer portion 62 is formed in a wide U-shape having a wide bottom portion in its cross-sectional shape. A tip portion of the retainer portion 62 on a vehicle interior side is formed by being bent in a hairpin shape, and a recess 63 is formed at a side end portion of the retainer portion 62 on the vehicle exterior side. An exterior installation base member 21 of an exterior weather strip 20 of the door weather strip 10, which will be described later, can be installed on and held in the recess 63.

The outer periphery of the door frame 2 on the vehicle interior side is formed at a position where the vehicle interior side is stepped lower than the vehicle exterior side on which the retainer portion 62 is attached, and a groove-shaped door frame retainer portion 2c is formed so that an interior installation base member 31 of an interior weather strip 30 of the door weather strip 10, which will be described later, can be installed The door frame retainer portion 2c is formed by bending an inner panel 2b of the door frame 2. Thus, the interior weather strip 30 of the door weather strip 10 is attached at a lower position than the exterior weather strip 20.

As shown in FIG. 3, the door weather strip 10 includes the exterior weather strip 20, the interior weather strip 30, and a connecting portion 40 connecting the exterior weather strip 20 and the interior weather strip 30. The exterior weather strip 20 is attached to the vehicle exterior side of the door frame 2, that is, the retainer portion 62 described above, and seals a tip portion on the vehicle exterior side between the vehicle body opening peripheral edge 6 and the door frame 2.

Figure 4A:
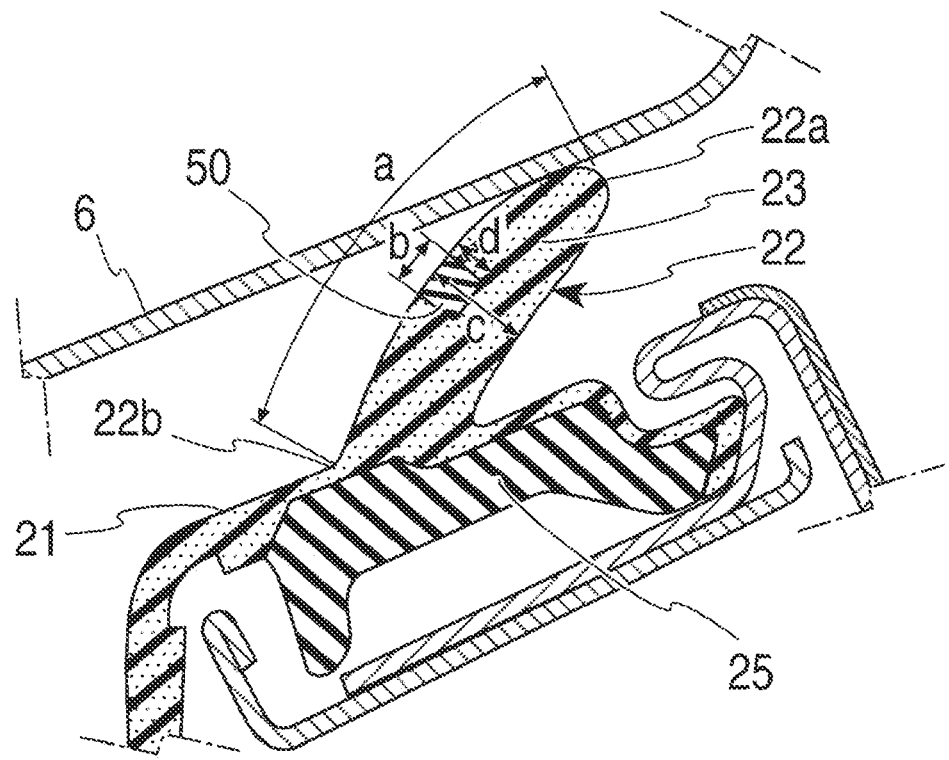
FIG. 4A is an enlarged cross-sectional view within the frame of FIG. 3.

As shown in FIGS. 3 and 4A, the exterior weather strip 20 of the door weather strip 10 is constituted of the exterior installation base member 21, a seal lip 22, and a hard portion 50. A core portion 25 is formed at a base portion of the exterior installation base member 21. In the exterior installation base member 21, bottom surfaces of side ends on the vehicle interior side and the vehicle exterior side are abutted against the retainer portion 62 of the door molding 60, and the side end on the vehicle exterior side is fitted and inserted into the recess 63 of the retainer portion 62 of the door molding 60. The hard portion 50 will be described in detail later. In FIGS. 3 and 4A, a portion of the seal lip 22 excluding the hard portion 50 is referred to as a seal lip main body portion 23.

In relation to the scope of claims of the present invention, in claim 1 in the scope of claims, the "installation base member" in " . . . , the door weather strip includes at least an installation base member installed on the door frame or a door molding, . . . " indicates the exterior installation base member 21.

The seal lip 22 is formed in a lip shape and protrudes and extends upward from the exterior installation base member 21 of the exterior weather strip 20 and on the vehicle exterior side. When the door 1 is closed, the seal lip 22 bends, and the vehicle body opening peripheral edge 6 side of a tip 22a elastically comes into contact with the vehicle body opening peripheral edge 6, so that a gap between the vehicle body opening peripheral edge 6 and a tip of the door molding 60 can be closed. The seal lip 22 has a lip shape, and the seal lip main body portion 23 is easily bent; therefore, a door closing force can be reduced.

As shown in FIGS. 3 and 4A, the hard portion 50 is located between the tip 22a of the seal lip 22 and the root portion 22b between the seal lip 22 and the exterior installation base member 21 and formed on the vehicle body opening peripheral edge 6 side. As shown in FIG. 4A, the hard portion 50 is formed slightly on the root portion 22b side with respect to a central portion between the tip 22a and the root portion 22b of the seal lip 22 on the vehicle body opening peripheral edge 6 side, a length b of the hard portion 50 is about one-fifth of a length a from the tip 22a to the root portion 22b, a depth d of the hard portion 50 is about half of a thickness c of the seal lip 22 of a forming portion of the hard portion 50, and the cross-sectional shape is formed into a substantially quadrangular shape. As is clear from FIG. 4A, the hard portion 50 is not abutted against the vehicle body opening peripheral edge 6 when the door 1 is closed.

Figure 4B:
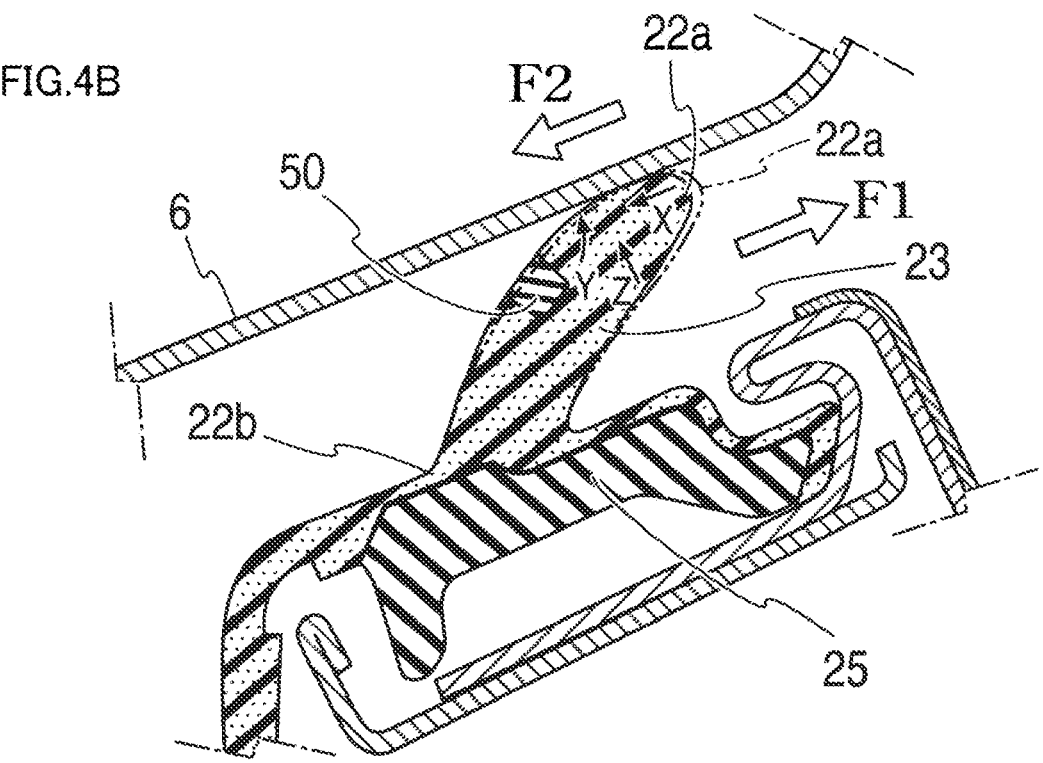
FIG. 4B is an enlarged cross-sectional view for explaining a behavior when a force in a drawing direction is applied during high-speed traveling in FIG. 4A.

FIG. 4B is an enlarged cross-sectional view within the frame of FIG. 3 for explaining a behavior when a drawing force F1 is applied during high-speed traveling of the automobile in FIG. 4A. Here, the dotted line indicates a position in FIG. 4A.

When the force F1 outward (vehicle exterior side) in a vehicle width direction is generated at the door frame 2 by a pressure difference between the inside and the outside of the automobile during high-speed traveling of the automobile, although a reaction force in an inward (vehicle interior side) direction in the vehicle width direction is applied to an abutment portion between the seal lip main body portion 23 of the seal lip 22 and the vehicle body opening peripheral edge 6, bending of the seal lip main body portion 23 is suppressed by the hard portion 50, a force X inward (vehicle interior side) in the vehicle width direction is applied to the tip 22a, and the tip 22a side relative to the hard portion 50 is deformed inward (vehicle interior side) in the vehicle width direction. At the same time, a force Y that pushes back the force X is generated at the seal lip main body portion 23 on the tip 22a side relative to the hard portion 50. The force Y acts so as to incline on the vehicle body opening peripheral edge 6 side as indicated by the arrow due to the above deformation.

By the way, since the seal lip 22 (seal lip main body portion 23) bends and elastically comes into contact with the vehicle body opening peripheral edge 6, a force Z that pushes the vehicle body opening peripheral edge 6 upward in a vertical direction is originally generated at an elastic contact portion. Thus, a force that presses the tip 22a of the seal lip main body portion 23 toward the vehicle body opening peripheral edge 6 is increased by the force X inward (vehicle interior side) in the vehicle width direction, the force Y that pushes back the force X, and the force Z that pushes the vehicle body opening peripheral edge 6 upward. Therefore, withstanding load with respect to a force in a direction of being drawn to the vehicle exterior side, that is, a reaction force F2 can be increased.

As a result, the reaction force F2 can be made equal to or closer to F1 even when the drawing force F1 becomes large, it is possible to suppress that the door frame 2 is drawn to the vehicle exterior side during high-speed traveling of the automobile, and to improve sound insulation during high-speed traveling as compared with the conventional case. Moreover, bending of the door frame 2 and the door molding 60 can be suppressed.

It is not necessary to newly form a large engagement block 500 as in Japanese Patent Application Laid-Open No. 2011-25855, and in addition, new processing such as forming a bulging portion 670 at the vehicle body opening peripheral edge 6 is not required. Therefore, problems from the viewpoint of cost and weight reduction can be solved.

Here, although the length b of the hard portion 50 is not limited to one-fifth of the length a from the tip 22a to the root portion 22b, it is desirable that the length b is one-tenth to one-fourth of the length a.

Figure 8:
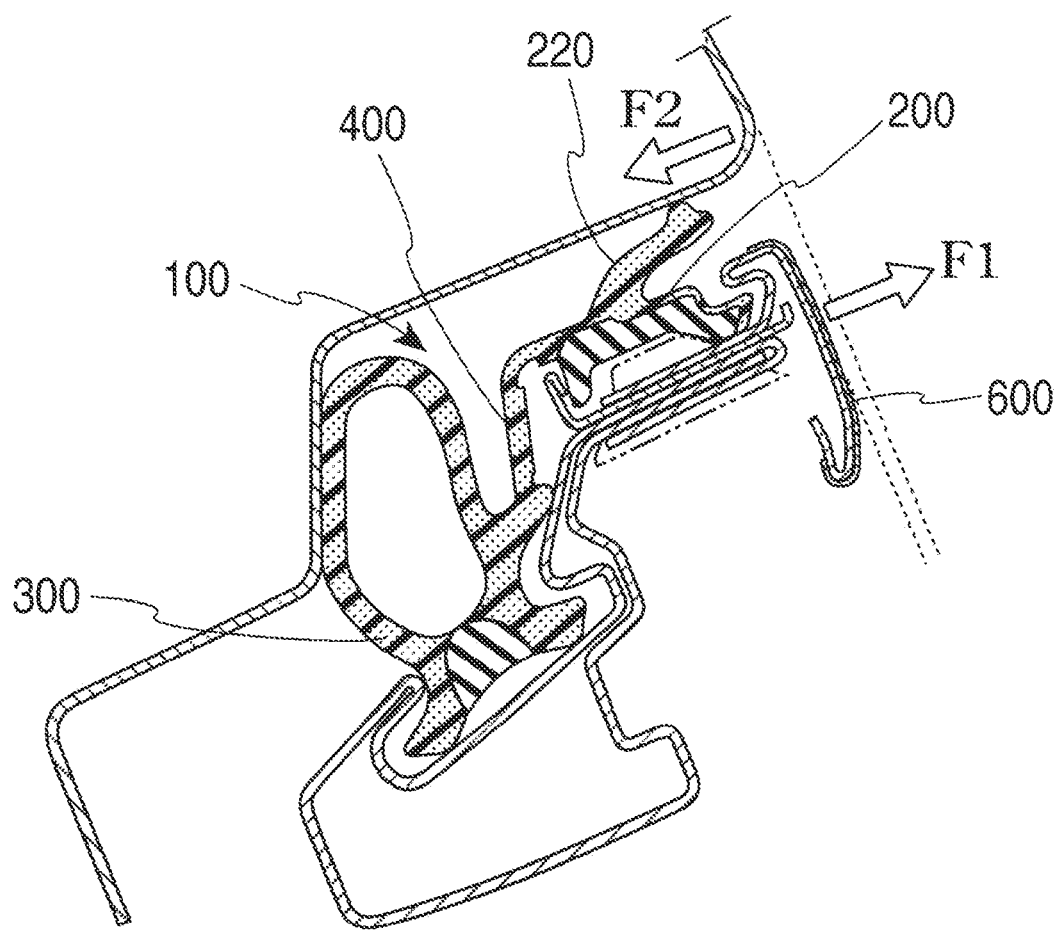
FIG. 8 is a cross-sectional view of the door weather strip of FIG. 7 along the line A-A in FIG. 1, for explaining drawing of a door frame outward (vehicle exterior side) in a vehicle width direction during high-speed traveling and a change of the door weather strip.
Figure 9:
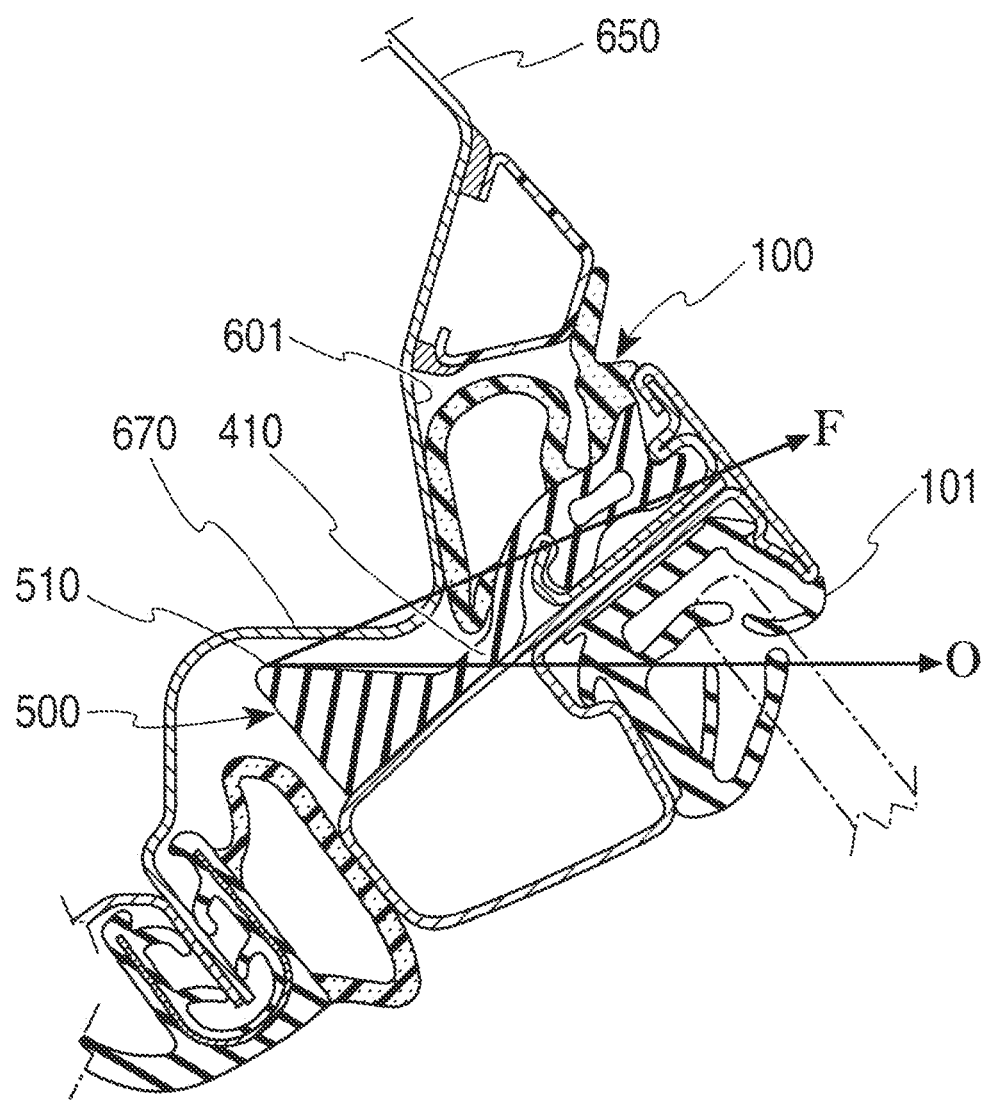
FIG. 9 is a cross-sectional view for explaining a conventional measure (Japanese Patent Application Laid-Open No. 2011-25855).

When the length b of the hard portion 50 is shorter than one-tenth, the seal lip main body portion 23 itself bends when the force outward (vehicle exterior side) in the vehicle width direction is generated at the door frame 2 by the pressure difference between the inside and the outside of the automobile during high-speed traveling of the automobile. The phenomenon is similar to a conventional phenomenon, that is, FIG. 8, and the effect of the present invention is small.

On the other hand, if the length b exceeds one-fourth, the seal lip main body portion 23 becomes difficult to bend, so that when the door 1 is closed, the closing force increases, and the door 1 becomes difficult to close.

It is desirable that the depth d of the hard portion 50 is a depth of one-fourth to half of the thickness c of the seal lip 22 of the forming portion of the hard portion 50. When the depth d of the hard portion 50 is thinner than one-fourth of the thickness c, the seal lip main body portion 23 itself bends when the force outward (vehicle exterior side) in the vehicle width direction is generated at the door frame 2 by the pressure difference between the inside and the outside of the automobile during high-speed traveling of the automobile, and the effect of the present invention is small.

On the other hand, when the depth d of the hard portion 50 is thicker than half of the thickness c, the seal lip main body portion 23 becomes difficult to bend, so that when the door 1 is closed, the closing force increases, and the door 1 becomes difficult to close.

The cross section of the hard portion 50 may be a semicircular shape, a triangular shape, or the like instead of a substantially quadrangular shape, that is, a shape that can be extruded.

The hard portion 50 is located near the central portion (including the tip 22a side and the root portion 22b side of the central portion) between the tip 22a and the root portion 22b of the seal lip 22 on the vehicle body opening peripheral edge 6 side, and it is desirable that the hard portion 50 is formed at a position where the hard portion 50 is not abutted against the vehicle body opening peripheral edge 6 when the door 1 is closed.

When the hard portion 50 is formed on the tip 22a side of the seal lip 22 and abutted against the vehicle body opening peripheral edge 6 when the door 1 is closed, the hard portion 50 affects an elastic contact of the tip 22a with the vehicle body opening peripheral edge 6 when the door 1 is closed, and it may not be possible to secure sealing performance between the door 1 and the vehicle body opening peripheral edge 6 as in the conventional case, which is not preferable.

The hard portion 50 uses a hard EPDM solid material, and its hardness is equal to or more than International Rubber Hardness (IRHD) 60. If the hardness of the hard portion 50 is less than the International Rubber Hardness (IRHD) 60, the hard portion 50 also bends together with the seal lip main body portion 23 when the force outward in the vehicle width direction is generated at the door frame 2 by the pressure difference between the inside and the outside of the automobile during high-speed traveling of the automobile, and the effect of the present invention is reduced.

In the door weather strip 10, a hard EPDM (ethylene propylene diene rubber) solid material was used for both core portions 25 and 35 of the exterior installation base member 21 and the interior installation base member 31. The hardness of the solid material is equal to or more than the International Rubber Hardness (IRHD) 60.

Although a suitable range of the hardness of the hard portion 50 is the same as a suitable range of the hardness of the core portion 25 of the exterior installation base member 21, the hardness of the hard portion 50 may be the same as or different from the hardness of the core portion 25 of the exterior installation base member 21.

On the other hand, a soft EPDM sponge material was used for portion other than the both core portions 25 and 35 of the exterior installation base member 21 and the interior installation base member 31 and the hard portion 50, that is, the exterior installation base member 21 other than the core portion 25, the seal lip main body portion 23, the connecting portion 40, the interior installation base member 31 other than the core portion 35, and a hollow seal portion 32. A specific gravity of the sponge material is 0.4 or more and 1.0 or less.

Figure 5:
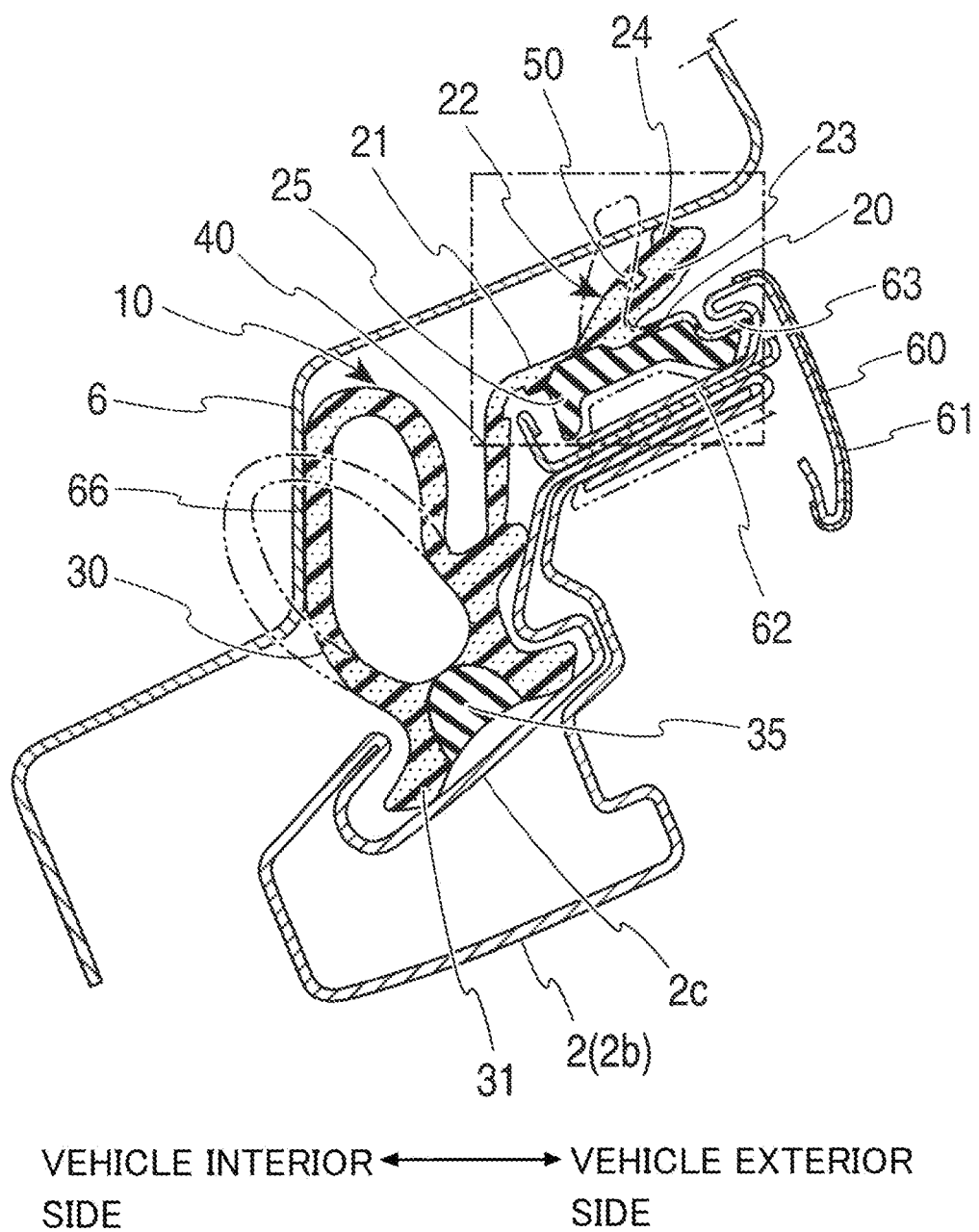
FIG. 5 is a cross-sectional view taken along the line A-A in FIG. 1 of a door weather strip used in a second embodiment of the present invention.
Figure 6A:
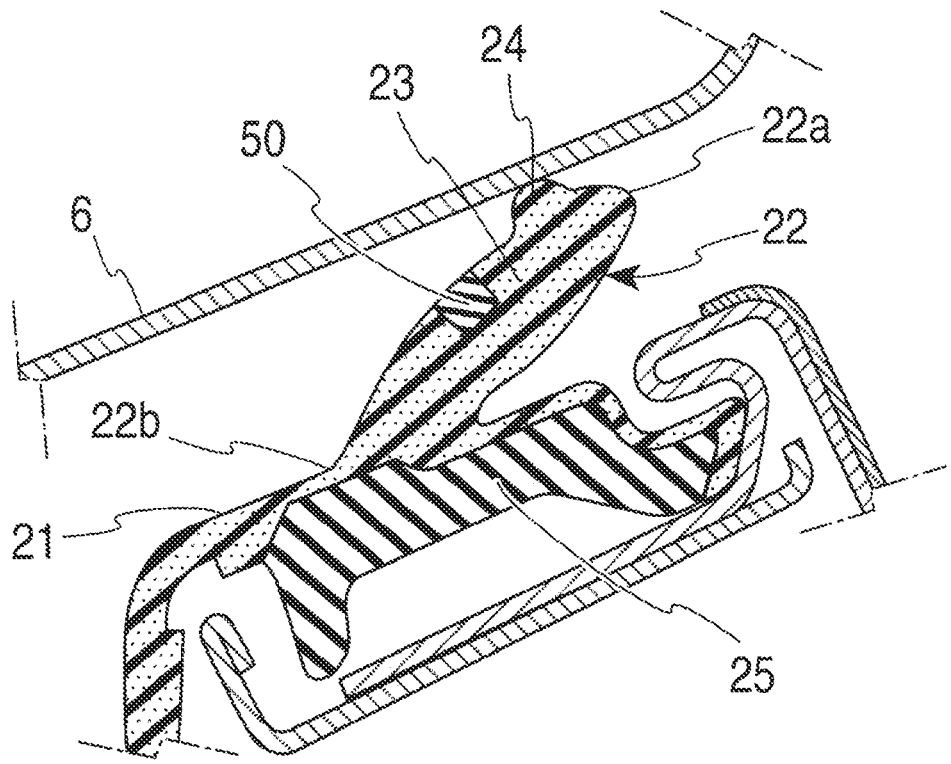
FIG. 6A is an enlarged cross-sectional view within the frame of FIG. 5.

Next, a second embodiment of the present invention will be described with reference to FIGS. 5 and 6. In the second embodiment, a difference from the first embodiment is that in the second embodiment, a protrusion 24 that elastically comes into contact with the vehicle body opening peripheral edge 6 when the door 1 is closed is formed between the tip 22a of the seal lip main body portion 23 of the seal lip 22 and the hard portion 50. Furthermore, the difference from the first embodiment is that the seal lip main body portion 23 exists between the protrusion 24 and the hard portion 50. For the protrusion 24, the same soft EPDM sponge material as the seal lip main body portion 23 was used.

Figure 6B:
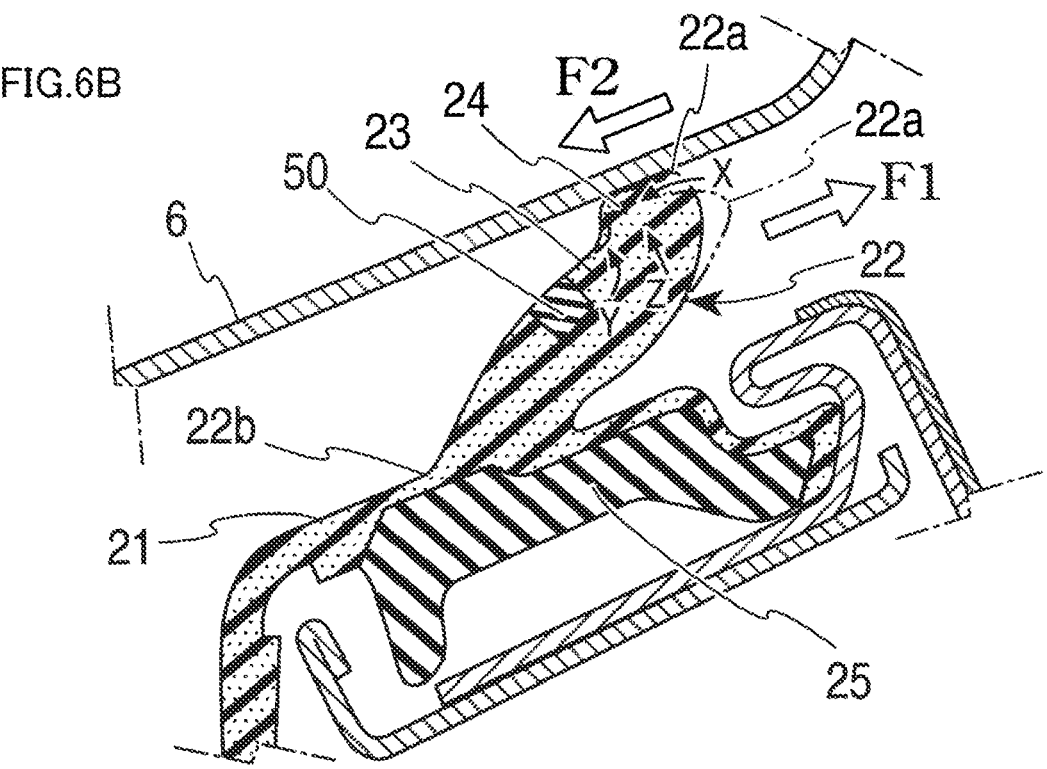
FIG. 6B is an enlarged cross-sectional view for explaining a behavior when a force in a drawing direction is applied during high-speed traveling in FIG. 6A.
Figure 7:
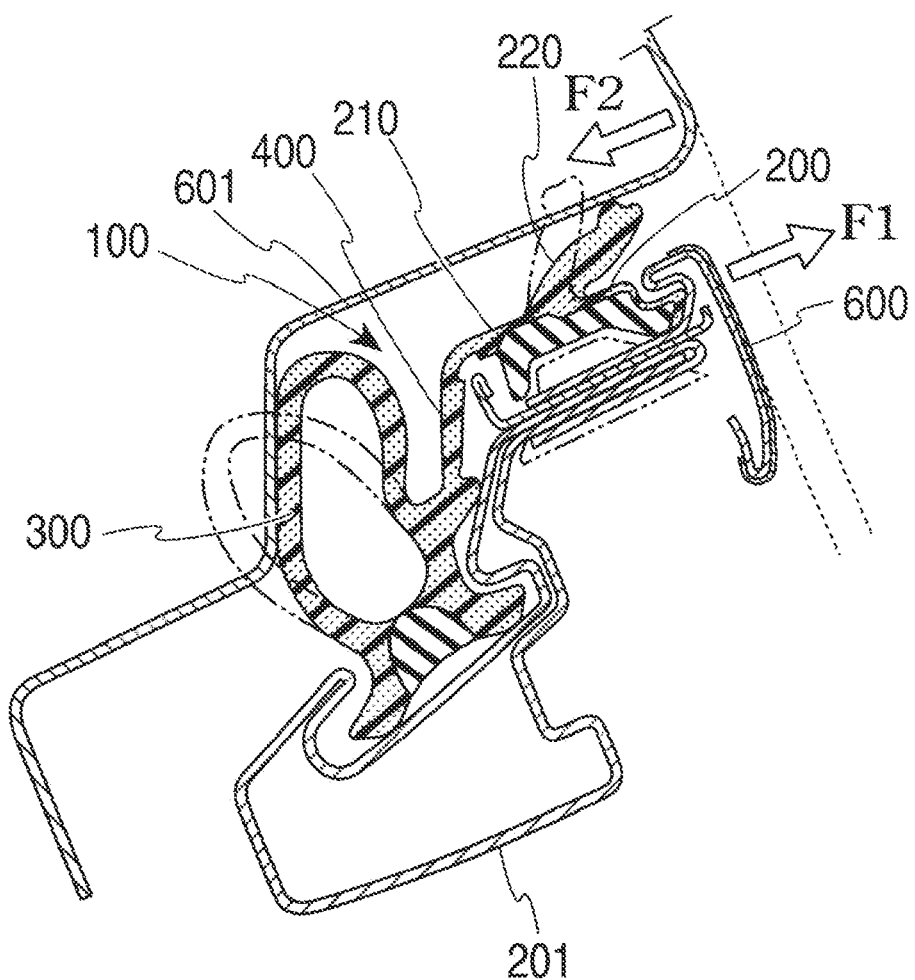
FIG. 7 is a cross-sectional view taken along the line A-A in FIG. 1 of a conventional door weather strip (Japanese Patent Application Laid-Open No. 2010-36602)

As shown in FIG. 6B, when the force F1 outward (vehicle exterior side) in the vehicle width direction is generated at the door frame 2 by the pressure difference between the inside and the outside of the automobile during high-speed traveling of the automobile, although the reaction force in the inward (vehicle interior side) direction in the vehicle width direction is applied to the abutment portion between the seal lip main body portion 23 of the seal lip 22 and the vehicle body opening peripheral edge 6, bending of the seal lip main body portion 23 itself is suppressed by the hard portion 50, the force X in the inward (vehicle interior side) direction in the vehicle width direction is generated on the tip 22a side relative to the hard portion 50, and the force deforms the protrusion 24 so as to rotate the protrusion 24 toward the root portion 22b of the seal lip main body portion 23.

Since the seal lip main body portion 23 exists between the protrusion 24 and the hard portion 50, the force Y that pushes back in a direction on the tip 22a side is generated in the seal lip main body portion 23 that exists. The force Y acts so as to incline on the vehicle body opening peripheral edge 6 side as indicated by the arrow due to the above deformation.

As a result, when the door 1 is closed, a portion that has been abutted against the vehicle body opening peripheral edge 6 by the protrusion 24 is expanded to a region from the protrusion 24 to the tip 22a due to deformation of the protrusion 24 based on the force X, and while an abutment area with the vehicle body opening peripheral edge 6 increases, the force Y that pushes back in the direction on the tip 22a side is applied; therefore, a force that presses the seal lip 22 against the vehicle body opening peripheral edge 6 increases, and the withstanding load with respect to the force F in the direction of being drawn to the vehicle exterior side, that is, the reaction force F2 can be increased.

Therefore, even when the drawing force F1 becomes larger than that of the first embodiment, the reaction force F2 can be made equal to or closer to F1, it is possible to further suppress that the door frame 2 is drawn to the vehicle exterior side during high-speed traveling of the automobile, and to improve the sound insulation during high-speed traveling. Moreover, bending of the door frame 2 and the door molding 60 can be suppressed.

In the implementation of the present invention, the present invention is not limited to the above-described embodiments, and it may be modified in various ways without departing from the scope of the present invention.

For example, in the second embodiment, although the seal lip main body portion 23 exists between the protrusion 24 and the hard portion 50, the hard portion 50 may be formed continuously with the protrusion 24.

For example, in the first to third embodiments, although the door weather strip 10 is formed by EPDM, the door weather strip 10 may be formed by an olefin-based thermoplastic elastomer (TPO) or a dynamically crosslinked thermoplastic elastomer (TPV).

For example, in the first and second embodiments, although the door weather strip 10 is formed by collecting the exterior weather strip 20, the interior weather strip 30, and the connecting portion 40 connecting the exterior weather strip 20 and the interior weather strip 30, the exterior weather strip 20 and the interior weather strip 30 may be formed separately without forming the connecting portion 40 and attached separately, or only the exterior weather strip 20 may be formed and attached without forming the interior weather strip 30 in addition to the connecting portion 40.

What is claimed is:

1. A door weather strip that seals between an automobile door and a vehicle body opening peripheral edge and is attached to an outer periphery of a door frame of the door, the door weather strip comprising at least:
    an installation base member installed on the door frame or a door molding; and
    a seal lip that is formed protruding and extending above and outside in a vehicle width direction from the installation base member and elastically comes into contact with the vehicle body opening peripheral edge when the door is closed,
    wherein a hard portion that is harder than a seal lip main body portion constituting the seal lip is formed between a tip of the seal lip and a root portion between the seal lip and the installation base member and on the vehicle body opening peripheral edge side.

2. The door weather strip according to claim 1, wherein the hard portion is not abutted against the vehicle body opening peripheral edge when the door is closed.

3. The door weather strip according to claim 1, wherein a protrusion that abuts against the vehicle body opening peripheral edge when the door is closed is formed on the seal lip between the tip of the seal lip and the hard portion.

4. The door weather strip according to claim 3, wherein the seal lip main body portion exists between the protrusion and the hard portion.

5. The door weather strip according to claim 1, where a length of the hard portion in a direction from the tip of the seal lip to the root portion is between one-tenth and one-fourth of a length of the seal lip from the tip of the seal lip to the root portion.

6. The door weather strip according to claim 1, where a depth of the hard portion is between one-fourth and one-half of a thickness of the seal lip.

* * * * *